United States Patent [19]

Takagi et al.

[11] Patent Number: 5,002,912

[45] Date of Patent: Mar. 26, 1991

[54] OXIDE SINTERED PRODUCT

[75] Inventors: Hiroyoshi Takagi, Kasugai; Masanobu Awano, Nagoya; Yoshitaka Kubota, Sagamihara; Yuzi Hoshi, Funabashi, all of Japan

[73] Assignees: Agency of Industrial Science and Technology; Nissan Chemical Industries, Ltd., both of Tokyo; Tosoh Corporation, Shinnanyo, all of Japan

[21] Appl. No.: 507,290

[22] Filed: Apr. 10, 1990

[30] Foreign Application Priority Data

Apr. 11, 1989 [JP] Japan .................................. 1-91139

[51] Int. Cl.$^5$ ............................................. C04B 35/46
[52] U.S. Cl. .................................................. 501/134
[58] Field of Search ......................... 501/134; 252/520

[56] References Cited

U.S. PATENT DOCUMENTS 4,655,967 4/1987 Morimoto et al. .................. 501/134

OTHER PUBLICATIONS

Takahashi et al., *Yogyo-Kyokai-shi*, 83 [12] 1975, pp. 589–594 (1975).
Yoko et al., *Journal of the Chemical Society of Japan*, 11, pp. 1946–1951 (1987).

*Primary Examiner*—Mark L. Bell
*Assistant Examiner*—Deborah Jones
*Attorney, Agent, or Firm*—Armstrong, Nikaido, Marmelstein, Kubovcik & Murray

[57] ABSTRACT

An oxide sintered product represented by the formula $$(TiO_2)_{1-x}(SbO_{5/2})_x$$

$$(0.1 \geq x \geq 0.005)$$

and having a bulk density of not less than 4.1 g/cm$^3$.

1 Claim, 2 Drawing Sheets

OXIDE SINTERED PRODUCT

BACKGROUND OF THE INVENTION

The present invention relates to a novel oxide sintered product and, more particularly, to a sintered product the electric resistance of which changes with a change in temperature with a negative temperature coefficient. Such sintered product can be used for temperature measurement, temperature compensation, etc., as a thermistor, for example.

Conventionally, Mn-Ni-Co type oxide sintered products, etc., have been known as thermistors for temperature measurement.

With such thermistors, however, the crystal structure changes in the vicinity of a temperature of 300° C. and the characteristics as a thermistor are lost as a result of the change, hence the upper limit of usable temperature was as low as 300° C.

For this reason, recently several thermistors such as those comprising a Zr type oxide sintered product, etc., have been developed as thermistors for measuring high temperatures. Such thermistors however show a high electric resistance below 700° C. so that they cannot be used for general purpose circuits.

The invention has been made in view of the conventional technical problems mentioned above. The purpose of the invention is to provide an oxide sintered product usable as a thermistor capable of continuously measuring the temperature from room temperature to 700° C. or so.

As a result of diligent investigations for solving said problems, the inventors have found a novel oxide sintered product, leading to the completion of the invention.

SUMMARY OF THE INVENTION

The invention provides an oxide sintered product represented by the formula

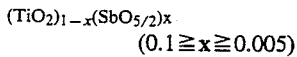

$$(0.1 \geq x \geq 0.005)$$

and having a bulk density of not less than 4.1 g/cm$^3$.

DETAILED DESCRIPTION OF THE INVENTION

Figure 1:
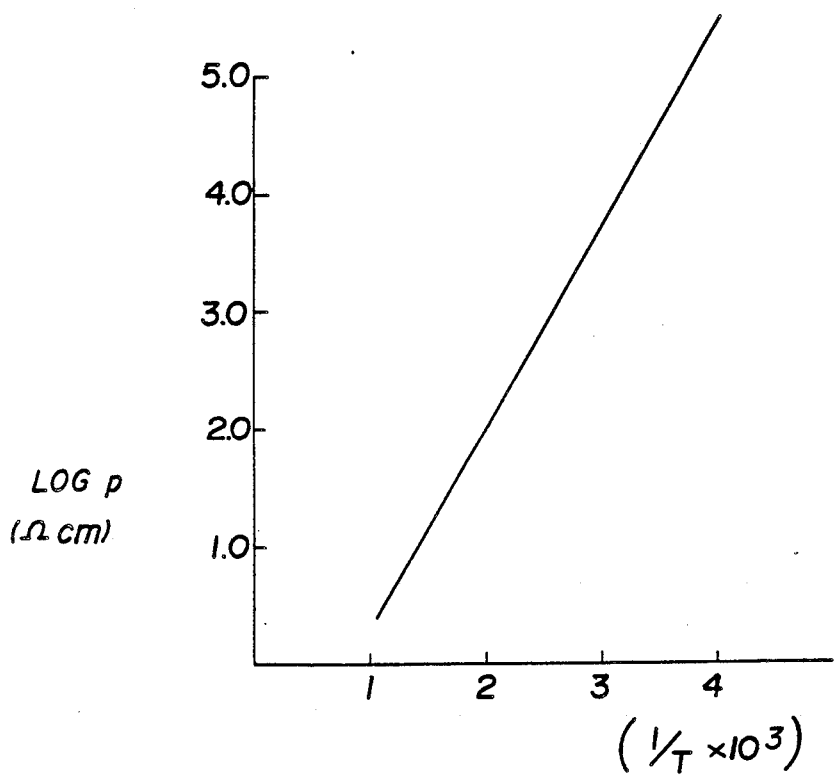
FIG. 1 through FIG. 4 are diagrams showing the relationship between specific resistance and temperature for the oxide sintered products of the invention obtained in Example 1 through 4, respectively.

In the following description, the invention is illustrated in detail. The oxide sintered product of the invention contains TiO$_2$ as a major ingredient. Since the melting point of TiO$_2$ is as high as 1840° C. and TiO$_2$ has a stable rutile structure at the temperature below the melting point, the crystal structure of the oxide sintered product does not change at a temperature of 700° C. or so, and thus any change in the characteristics as a thermistor accompanying the change in crystal structure also does not take place. Moreover, the sintered product of the invention contains an oxide of Sb, which introduces mobile electrons contributing to the conductivity in large amounts into the sintered product.

In the sintered product of the invention, having the above composition, the B value, which is an index indicating the sensitivity to temperature according to the following equation $$\rho = \rho_o \exp B (1/T - 1/T_o)$$

(wherein, $\rho$ and $\rho_o$ indicate specific resistances at absolute temperatures of T and To, respectively), is 1000 to 5000K at a temperature from room temperature to 700° C., and the specific resistance at room temperature is 10$^7 \Omega$. cm or less. By using the sintered product of the invention as a thermistor, therefore it becomes possible to measure the temperature with good sensitivity within a temperature range from room temperature to 700° C.

When the amount of oxide of Sb in the sintered product is less than the range shown in the above formula, the specific resistance at room temperature of the sintered product is high. When the amount of Sb oxide is more than the range shown in the above formula, the change in the B value due to temperature becomes significant so that the performance of the sintered product as a thermistor is in danger of being lost. The oxide sintered product of the invention is a dense sintered product having a bulk density of not less than 4.1 g/cm$^3$, which causes the change in the B value of the sintered product due to temperature to be small For the reasons mentioned above, the sintered product of the invention is preferably used as a thermistor permitting continuous measurement at a temperature from room temperature to 700° C. Furthermore, from the fact that the B value and the specific resistance at room temperature of the sintered product of the invention lie within the above range, this sintered product can be used in thermistor instruments currently on the market.

The sintered product of the invention can be obtained by molding and sintering, for example, TiO$_2$ powder with Sb in the form of solid solution after the preparation of the composition.

For molding the powder of raw material, various methods, for example, a press method, an extrusion method, an injection molding method, a slip casting method, a tape casting method, etc., can be adopted.

At this time, it is preferable that the density of the molded powder should be not less than 2.0 g/cm$^3$, and if the density is less than 2.0 g/cm$^3$, the relative density of the sintered product may be too low.

The molded powder having the density of not less than 2.0 g/cm$^3$ can be obtained by adjustment of the molding conditions, for example when the press method is adopted as the molding method, it is preferable to mold under a pressure higher than 1 ton/cm$^2$.

Moreover, the sintering can be performed in the atmosphere, and the sintered product of the invention can be obtained by sintering for more than 1 hour at a temperature of 1300° to 1400° C. or so.

In the following description, the invention will be illustrated in more detail based on the examples, but the invention is not confined to these examples at any rate.

EXAMPLE 1

TiCl$_4$ was added to a 3N aqueous solution of hydrochloric acid and the mixture was stirred, then SbCl$_5$ was added to said aqueous solution, and the ratio of TiCl$_4$ to SbCl$_5$ was 1.0 mol %:99.0 mol % in the solution. Thereafter, Methyl Red was added to this solution as an indicator and aqueous ammonia was added with stirring to the solution until the solution changed to yellow, and precipitates were obtained in the solution. Next, the precipitates were filtered, dried at 100° C., and then calcined for 1 hour at 500° C. Following this, the calcined product obtained was pulverized for 24 hours with a ball mill, and the pulverized product was used as the powder of raw material.

The powder of raw material obtained in this way was molded (K1=19.3 mm, W—4.2 mm, h=3.0 mm) by a cold isostatic method under a pressure of 1 ton/cm$^2$ and then it was fired for 2 hours at a temperature of 1300° C. to obtain a sintered product.

The composition of the sintered product thus obtained was $$(TiO_2)_{0.99}(SbO_{5/2})_{0.01}$$

and the bulk density was 4.18 g/cm$^3$.

Next, the specific resistance of this sintered product was measured while varying the temperature from 12° to 700° C.

Plotting the reciprocal of the temperature and the logarithm of the specific resistance on the abscissa and ordinate, respectively, the relationship between the specific resistance and temperature is shown in FIG. 1. As a result, it was determined that the B value of the sintered product obtained was 1708K and remained at a constant value. Further, when the specific resistance at room temperature of this sintered product was measured, it was found to be $1.0 \times 10^4 \Omega.cm$.

EXAMPLE 2

The sintered product was obtained by the same method as that in Example 1 except that TiCl$_4$ was added to a 3N aqueous solution of hydrochloric acid and the mixture was stirred, then SbCl$_5$ was added to said aqueous solution, and the ratio of TiCl$_4$ to SbCl was 97.5 mol % :2.5 mol % in the solution.

The composition of the sintered product thus obtained was $$(TiO_2)_{0.975}(SbO_{5/2})_{0.025}$$

and the bulk density was 4.23 g/cm$^3$.

Figure 2:
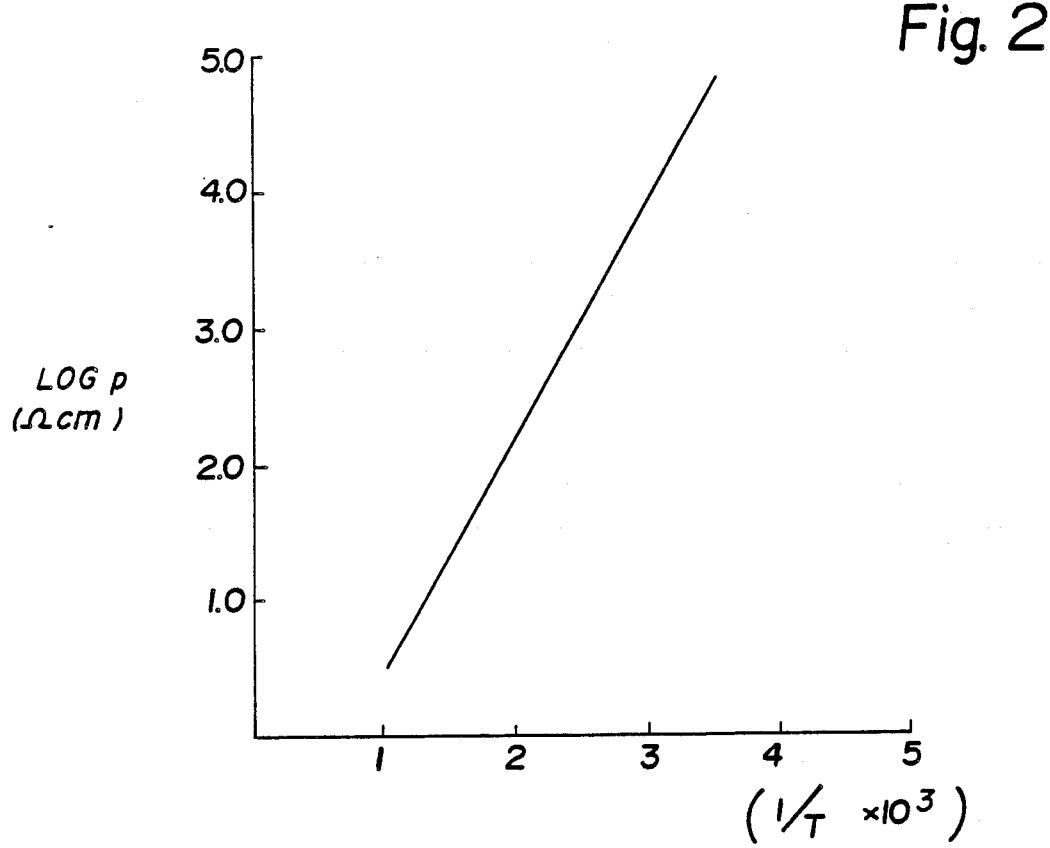

Moreover, the specific resistance of this sintered product was measured while varying the temperature. Plotting the reciprocal of the temperature and the logarithm of the specific resistance on the abscissa and ordinate, respectively, the relationship between the specific resistance and temperature is shown in FIG. 2. The B value of the sintered product obtained was 1747K and remained at a constant value. Moreover, the specific resistance at room temperature of this sintered product was $2.0 \times 10^4 \Omega.cm$.

Additionally, the specific resistance of this sintered product was measured while varying the temperature. Plotting the reciprocal of the temperature and the logarithm of the specific resistance on the abscissa and ordinate, respectively, the relationship between specific resistance and temperature is shown in FIG. 2. The B value of the sintered product obtained was 1708K and remained at a constant value. Moreover, the specific resistance at room temperature of this sintered product was 107 $\Omega.cm$.

EXAMPLE 3

The sintered product was obtained by the same method as that in Example 1 except that TiCl$_4$ was added to a 3N aqueous solution of hydrochloric acid and the mixture was stirred, then SbCl$_5$ was added to said aqueous solution, and the ratio of TiCl$_4$ to SbCl$_5$ was 95.0 mol %: 5.0 mol % in the solution.

The composition of the sintered product thus obtained was $$(TiO_2)_{0.95}(SbO_{5/2})_{0.05}$$

and the bulk density was 4.28 g/cm$^3$.

Figure 3:
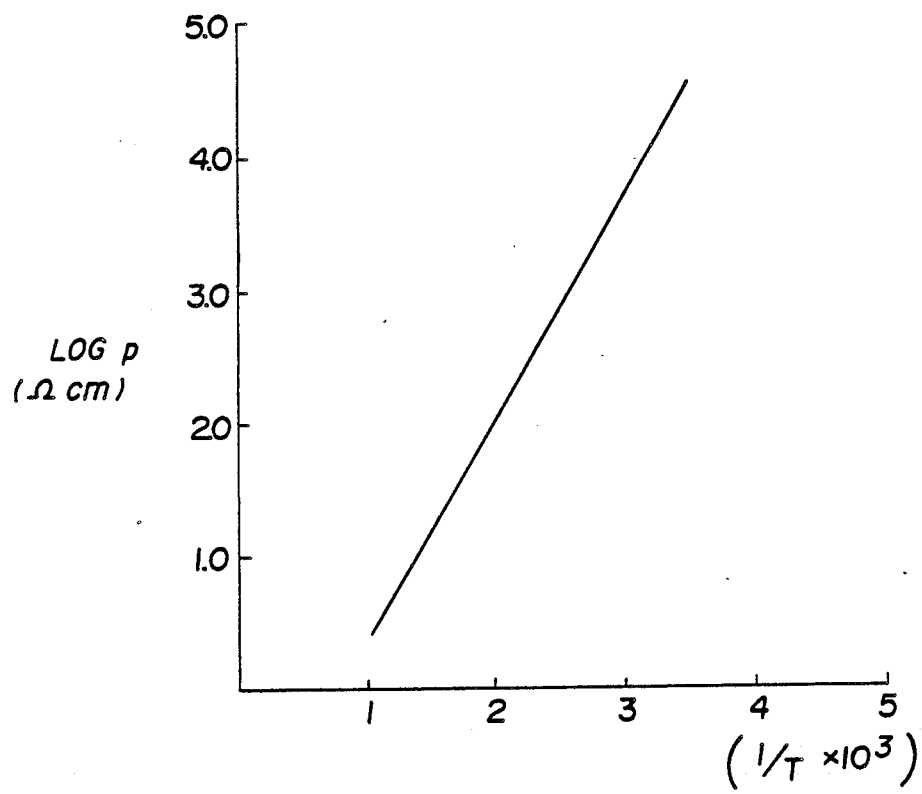

Moreover, the specific resistance of this sintered product was measured while varying the temperature. Plotting the reciprocal of the temperature and the logarithm of the specific resistance on the abscissa and ordinate, respectively, the relationship between the specific resistance and temperature is shown in FIG. 3. The B value of the sintered product obtained was 1738K and remained at a constant value. Moreover, the specific resistance at room temperature of this sintered product was $1.5 \times 10^4 \Omega.cm$.

EXAMPLE 4

The sintered product was obtained by the same method as that in Example 1 except that TiCl$_4$ was added to a 3N aqueous solution of hydrochloric acid and the mixture was stirred, then SbCl$_5$ was added to said aqueous solution, and the ratio of TiCl$_4$ to SbCl$_5$ was 90.0 mol %: 10.0 mol % in the solution.

The composition of the sintered product thus obtained was $$(TiO_2)_{0.9}(SbO_{5/2})_{0.1}$$

and the bulk density was 4.28 g/cm$^3$.

Figure 4:
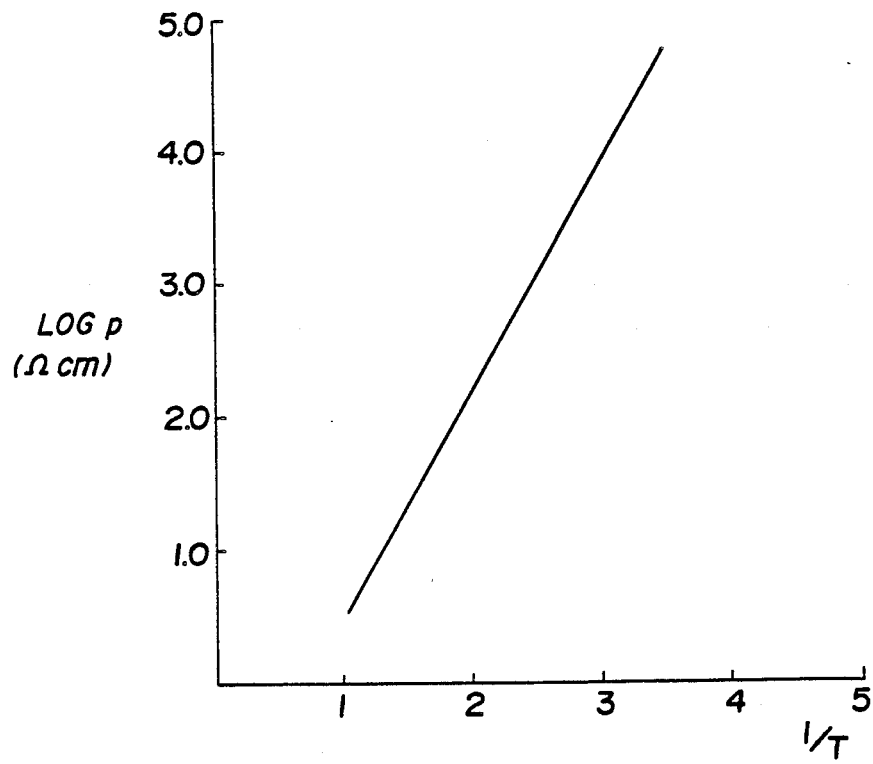

Moreover, the specific resistance of this sintered product was measured while varying the temperature. Plotting the reciprocal of the temperature and the logarithm of the specific resistance on the abscissa and ordinate, respectively, the relationship between specific resistance and temperature is shown in FIG. 4. The B value of the sintered product obtained was 1650K and remained at constant value. Moreover, the specific resistance at room temperature of this sintered product was $3.0 \times 10^4 \Omega.cm$.

As described above, the sintered product of the invention has a specific resistance as low as not more than $10^7 \Omega.cm$, which changes with a change in temperature with a negative temperature coefficient, and the crystal structure of the sintered product does not change even at a temperature of 700° C. or so. The sintered product of the invention can be used therefore as a thermistor capable of continuously measuring the temperature from room temperature to 700° C., which has never been realized up to this day.

What is claimed is:

1. An oxide sintered product represented by the composition formula $$(TiO_2)_{1-x}(SbO_{5/2})_x$$

$$(0.1 \geq x \geq 0.005)$$

and having a bulk density of not less than 4.1 g/cm$^3$.

* * * * *